(12) United States Patent
Yang et al.

(10) Patent No.: US 7,205,912 B1
(45) Date of Patent: Apr. 17, 2007

(54) STRUCTURED SET PARTITIONING AND MULTILEVEL CODING FOR PARTIAL RESPONSE CHANNELS

(75) Inventors: Xueshi Yang, Pittsburgh, PA (US); Alexander Kuznetsov, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/263,128

(22) Filed: Oct. 31, 2005

(51) Int. Cl.
*H03M 7/00* (2006.01)

(52) U.S. Cl. .......................... 341/59; 714/800; 714/755

(58) Field of Classification Search .................. 341/59, 341/58, 95; 714/755, 792, 699, 800; 369/47; 375/265
See application file for complete search history.

(56) References Cited

U.S. PATENT DOCUMENTS

| | | | |
|---|---|---|---|
| 5,412,666 A * | 5/1995 | Squires et al. ............... | 714/755 |
| 6,014,411 A | 1/2000 | Wang .......................... | 375/259 |
| 6,704,368 B1 * | 3/2004 | Nefedov ...................... | 375/265 |
| 6,748,079 B1 | 6/2004 | Downing ..................... | 380/201 |
| 6,751,269 B1 | 6/2004 | Shalvi et al. ................. | 375/298 |
| 6,829,742 B1 | 12/2004 | Jung et al. ................... | 714/790 |
| 6,865,236 B1 | 3/2005 | Terry ........................... | 375/279 |
| 6,917,313 B1 * | 7/2005 | Burd et al. .................... | 341/58 |
| 6,961,010 B2 * | 11/2005 | Tsang ........................... | 341/59 |
| 2004/0117720 A1 | 6/2004 | Choi et al. ................... | 714/792 |
| 2004/0136313 A1 | 7/2004 | Goldstein et al. ........... | 370/203 |
| 2004/0139378 A1 | 7/2004 | Akhter et al. ................ | 714/755 |
| 2004/0205423 A1 * | 10/2004 | Shim et al. ................... | 714/699 |
| 2005/0066261 A1 * | 3/2005 | Morita et al. ................ | 714/800 |
| 2005/0149843 A1 | 7/2005 | Shen et al. ................... | 714/800 |

* cited by examiner

*Primary Examiner*—Rexford Barnie
*Assistant Examiner*—Joseph Lauture
(74) *Attorney, Agent, or Firm*—Westman, Champlin & Kelly, P.A.

(57) ABSTRACT

A method and apparatus for channel coding useful for recording channel and other communications applications. The proposed channel coding method is actualized via structured set partition (SSP) in conjunction with multilevel coding (MLC) and offers performance gains over conventional coding schemes with comparable complexity at the bit-error rate (BER) level as well as the sector failure rate (SFR) level.

20 Claims, 9 Drawing Sheets

STRUCTURED SET PARTITIONING AND MULTILEVEL CODING FOR PARTIAL RESPONSE CHANNELS

FIELD OF THE INVENTION

The present invention relates generally to coding and decoding data for transmission through a partial response channel, and more particularly but not by limitation to coding and decoding data for transmission through a data storage channel.

BACKGROUND OF THE INVENTION

Data communication channels generally include encoding of data before it passes through a communication medium, and decoding of data after it has passed through a communication medium. Data encoding and decoding is used, for example, in data storage devices for encoding data that is written on a storage medium and decoding data that is read from a storage medium. Encoding is applied in order to convert the data into a form that is compatible with the binary characteristic of the storage medium, and can include processes such as adding error correction codes, interleaving, turbo encoding, bandwidth limiting, amplification and many other known encoding processes. Decoding processes are generally inverse functions of the encoding processes. Encoding and decoding increases the reliability of the reproduced data.

The increasing demand for high data rate communications systems and high-density data storage devices has lead to intensive focus on implementation issues of encoding and decoding that provides a combination of low bit error rate (BER), high speed, low power coding and decoding, and low cost. In designing encoders and decoders, there are complex design tradeoffs that keep changing as technologies advance.

As the performance in the area of higher speed and lower power consumption improve in other parts of a data storage device, there is a need to advance the design of the encoding and decoding in the data communication channel such that the encoding/decoding performance does not limit the overall performance of new design data storage devices.

Embodiments of the present invention provide solutions to these and other problems, and offer other advantages over the prior art.

SUMMARY OF THE INVENTION

Disclosed are an apparatus and a method of encoding and decoding user data. The encoding comprises receiving a block of user data and providing a block of DC-free encoded data. The encoding comprises performing a reverse rate-1 mapping of the block of DC-free encoded data based on structured set partitioning to provides an intermediate data sequence. The encoding comprises generating redundant bits based on the intermediate data sequence using a multilevel encoder (MLC). The encoding comprises concatenating the redundant bits with the DC-free encoded data and communicating the result to a partial response channel.

The decoding comprises detecting encoded data received from the binary medium and providing an estimated MLC encoded user data output. The decoding comprises decoding the MLC encoded data, and generating a MLC decoded data output. The decoding comprises DC-free decoding the MLC decoded data output to provide a decoded user data output.

Other features and benefits that characterize embodiments of the present invention will be apparent upon reading the following detailed description and review of the associated drawings.

DETAILED DESCRIPTION OF ILLUSTRATIVE EMBODIMENTS

Disclosed here is a method and apparatus for channel coding useful for recording channel and other partial response channel applications. The proposed channel coding method is actualized via structured set partition (SSP) in conjunction with multilevel coding (MLC) and offers performance gains over conventional coding schemes with comparable complexity at the bit-error rate (BER) level as well as the sector failure rate (SFR) level.

The set partitioning and multilevel coding (MLC) jointly optimize modulation (signal mapping) and coding so that the code is optimized in Euclidean space rather than with traditional Hamming distances. Free Euclidean distances, rather than Hamming distances, define system performance, in particular at SNR regions that are of practical interest. For most set partition and MLC work on typical transmission channels, a multilevel/phase signal constellation is available. However, for magnetic recording channels, binary saturated recording is the only practical channel signaling method. In such binary saturated channels, realization of set partition and/or MLC is simulated by intentionally introduced inter-symbol interference (ISI). Channel outputs from ISI channels can be conveniently characterized by a trellis, which in turn facilitates a set partition and/or MLC implementation.

Figure 1A:
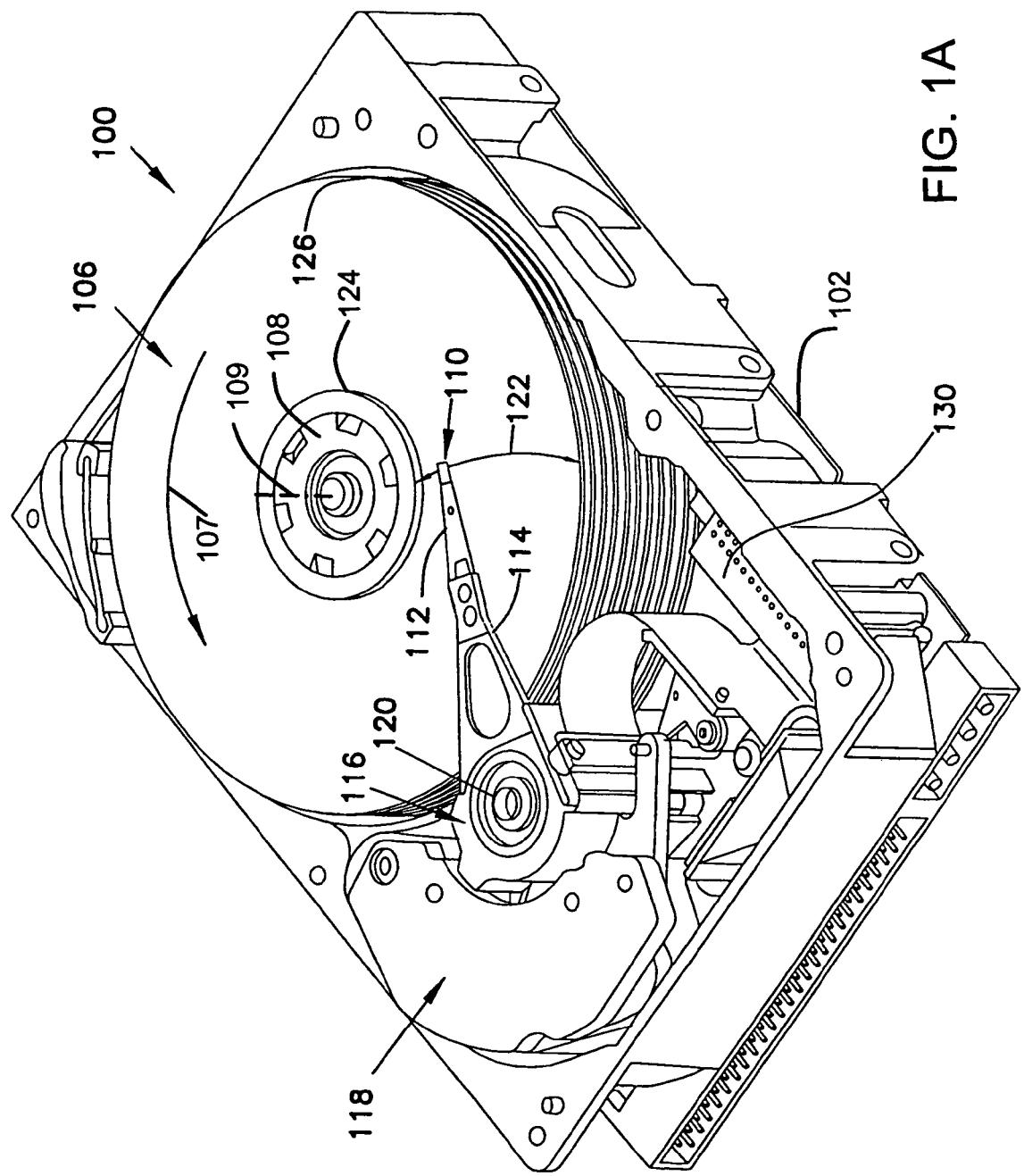
FIG. 1A illustrates an oblique view of a disc drive.

FIG. 1A is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. The heads 110 include a write head and a read head that couple to the desired data track which serves as a binary saturated communication medium. Voice coil motor 118 is driven by servo electronics 130 based on signals generated by heads 110 and a host computer (not shown).

The magnetic recording channel is approached as a partial response (PR) channel given by a polynomial $f(D)=f_0+f_1D+f_2D^2+ \ldots +f_mD^m$ with integer (or real) coefficients. An output word $y=(y_1, y_2, \ldots, y_N)$ of the PR channel is defined as the linear convolution of the input coded (or uncoded) word $x=(x_1, x_2, \ldots, x_N)$ of length N with $x_i=1$ or $-1$, and the coefficients $(f_0, f_1, \ldots, f_m)$ as:

$$y_i = \sum_{j=0}^{m} f_j x_{i-j} \qquad \text{Equation 1}$$

where $i=1, 2, \ldots, N$, for $i<1$, and $x_i$ is determined by the channel state. The relationship between the input and output words can be described by a trellis with $2^m$ states $s \in \{0,1\}^m$, where $s_i$ is related to $x_i$ by $$x_i = 2s_i - 1. \qquad \text{Equation 2}$$

Given the state $$S_i = (s_{i,0}, s_{i,1}, \ldots, s_{i,m-1}) \qquad \text{Equation 3}$$

at time $i=0, 1, \ldots, N-1$, the next state is defined as $$S_{i+1} = (s_{i,1}, s_{i,2}, \ldots, s_{i,m-1}, s_{i,m}) \qquad \text{Equation 4}$$

The label of the edge between $S_i$ and $S_{i+1}$ is the channel output symbol $y_i$ defined by Equation 1. The input and output relationship can be written in a more compact matrix form. Denote $X^- = (x_{i-m}, \ldots, x_{i-2}, x_{i-1})$ and its binary version $S^- = (s_{i-m}, \ldots, x_{i-2}, s_{i-1})$. The vector $X^-$ and $S^-$ are the states of the channel at time instant i. Given the trellis state $S^-$ and a block of binary input $S=(s_i, s_{i+1}, \ldots, s_{i+L})$ of length L, the output can be written as $$Y=f(S^- \diamond S) = X \times F \qquad \text{Equation 5}$$

where X is the bipolar representation of vector $S^- \diamond S$, $\diamond$ is the concatenation operator, and F is an m+L by L matrix given by $$F = \begin{vmatrix} f_m & 0 & \cdots & 0 \\ f_{m-1} & f_m & \cdots & 0 \\ \cdots & \cdots & \cdots & \cdots \\ f_0 & f_1 & \cdots & f_m \\ 0 & f_0 & \cdots & f_{m-1} \\ \cdots & \cdots & \cdots & \cdots \\ 0 & 0 & \cdots & f_0 \end{vmatrix} \qquad \text{Equation 6}$$

The output corresponding to an input vector of length L and a channel state $S^-$ (of length m) is a vector of length L. In the channel output sequence Y in an L-dimensional Euclidean space S, each input sequence S in conjunction with the channel state $S^-$ correspond to a signal point in the L-dimensional space S. The mapping rule is defined by Equation 5.

Now, in the signal constellation space S, set partitioning is designed by employing the rules described in Channel coding with multilevel/phase signals, IEEE Trans. Inform. Theory, vol. IT-28, pp. 55–67, 1982. One signal point in the space represents a sequence of channel output. Due to extensive channel memory, however, such a set partitioning process is more involved than memoryless channels with conventional multilevel/phase signaling. Realizing good distance properties between subsets is often realized by brute force computer searching. In particular, given the channel state $S^-$ and input S of length L, the squared Euclidean distance between signal point $y=(y_i, y_{i+1}, \ldots, y_{i+L-1})$ and $y'=(y'_i, y'_{i+1}, \ldots, y'_{i+L-1})$ is computed as $$d(y, y') = \sum_{i=0}^{L-1} (y_i - y'_i)^2. \qquad \text{Equation 7}$$

During the partitioning process, the algorithm needs to calculate the distance between every pair of signal points in the associated subsets. Thus, the brute force computation complexity grows exponentially with the number of partition levels and the channel memory length.

A systematic way of structured set partitioning (SSP) is described below using multiple embedded linear subspaces and their cosets.

Let $E^L$ be the set of all binary words of length L with components 0 and 1, $$T(S^-) = \{Y = f(S^- \diamond S), S \in E^L\} \qquad \text{Equation 8}$$

and T be the union of T ($S^-$) over $S^-$, i.e., $$T = \bigcup_{S^-} T(S^-) = \{Y = f(S^- \diamond S), (S^- \diamond S) \in E^{m+L}\} \qquad \text{Equation 9}$$

Thus, $T(S^-)$ represents the set of signal points (in the L dimensional signal space S) originating from the channel state $S^-$, which is a subset of T(S) denoting the signal set of all channel output with length L. Since the mapping from $E^{m+L}$ signal set T(S) is deterministic and one-to-one, set partition can be performed on the linear space $E^{m+L}$.

Formally, the partitioning is performed as follows:

1. First level partition: over the whole linear space $E^{m+L}$, a subspace V of dimension k(1) is chosen, and $L(1)=2^{k-k(1)}-1$ cosets $W_1, W_2, \ldots, W_{L(1)}$ are constructed. In particular, the coset leaders of the cosets $W_1, W_2, \ldots, W_{L(1)}$ are $a_1, \ldots, a_{L(1)}$, respectively. In other words, $$W_i = V \oplus a_i \qquad \text{Equation 10}$$

for $i=1, \ldots, L(1)$. The basic subspace V is the trivial coset $W_0$ and corresponds to the coset leader $a_0 = \{0, \ldots, 0\} \in V$. Let $$T_i = \{y = f(s), s \in W_i\} \qquad \text{Equation 11}$$

and $$d_1^2 = \min_{i,j,i\neq j} \min_{y,z} d(y \in T_i, z \in T_j) \qquad \text{Equation 12}$$

where d(y,z) is the squared Euclidean distance between y and z as defined in Equation 7. To see that $T_i$ is a partition of T, note that if $d_1^2>0$, $T_i \cap T_j = \emptyset$ for all $i \neq j$. Furthermore, it maintains that $T = \cup T_i$.

2. Second level partition: for each coset $W_i$ of the first level partition, a new subspace $V_i$ of dimension k(2)<k(1) is chosen in $W_i$. Subsequently, $L(2)=2^{k(1)-k(2)}-1$ cosets $W_{i,1}$, $W_{i,2}, \ldots, W_{i,L(2)}$ of $V_i$ are constructed, which correspond to coset leaders $a_{i,1}, a_{i,2}, \ldots, a_{i,L(2)}$, respectively. $V_i$ is the trivial coset with coset leader $a_{i,0}=(0, 0, \ldots, 0) \in V$. Similarly, by defining $$T_{i,j} = \{y=f(s), s \in W_{i,j}\}, j=0, \ldots, L(2) \qquad \text{Equation 13}$$

and $$d_2^2 = \min_i \min_{j,h,j \neq h} \min_{y,z} d(y \in T_{i,j}, z \in T_{i,h}), \qquad \text{Equation 14}$$

$T_{i,j}$ is a partition of $T_i$ and T.

The partition can be carried on further to more levels following similar operations described above. For example, the subspace $W_{i,j}$ at the second level can be further partitioned into $W_{i,j,0}, W_{i,j,1}, \ldots, W_{i,j,L(3)}$, where L(3) is the number of subspaces that $W_{i,j}$ contains and it holds that $L(3)=2^{k(2)-k(3)}-1$ and k(3) is the dimension of the subspaces on the third partition level.

Once the set partition tree is completed, mapping from the input bits to transmitted channel bits (or SSP encoding) can be realized by assigning the branch address labels of the partition tree to the input bits accordingly. As a specific example, let us assume a three level two-way partition, i.e., L=3, L(1)=L(2)=L(3)=1, constructed on an ISI channel of length m+1=3. Given a channel state $s^-=(s_{i-2}, s_{i-1})$ and a block of input $u=(u_i, u_{i+1}, u_{i+2})$ of length 3, the input sequence can be encoded such that $u_i$ represents the least significant bit which has a minimum squared Euclidean distance $d_1^2$, while $u_{i+2}$ represents the most significant bit which has a minimum squared Euclidean distance $d_3^2$. This is made possible by walking along the partitioning tree and assigning the branch label to the input bits. Specifically, it can be done in the following way. Given the input($u_i, u_{i+1}, u_{i+2}$), first the coset $W_{u_i, u_{i+1}, u_{i+2}}$ is chosen. Since there are exactly 8 cosets $W_{i,j,k}$ at the third level, the assignment $i=u_i$, $j=u_{i+1}$ and $k=u_{i+2}$ can always be made. In each coset, $W_{u_i, u_{i+1}, u_{i+2}}$, there are 4 binary words $(s_{i-2}, s_{i-1}, s_i, s_{i+1}, s_{i+2})$ corresponding to 4 different channel states $s^-$. The channel state $s^-=(s_{i-2}, s_{i-1})$ now uniquely determines the mapped outputs $(s_i, s_{i+1}, s_{i+2})$. This also defines the channel state for the next block of input bits.

After the mapping, the (noise free) channel outputs corresponding to the block of input ($u_i, u_{i+1}, u_{i+2}$) possess the following properties:

1. the minimum squared Euclidean distance in the 3-dimensional output signal space is at least $d_1^2$ for the signal outputs corresponding to input ($u_i, u_{i+1}, u_{i+2}$) and ($u'_i, u'_{i+1}, u'_{i+2}$), if $u_i \neq u'_i$;

2. the minimum squared Euclidean distance in the 3-dimensional output signal space is at least $d_2^2$ for the signal outputs corresponding to input ($u_i, u_{i+1}, u_{i+2}$) and ($u'_i, u'_{i+1}, u'_{i+2}$), if $u_i=u'_i$, but $u_{i+1} \neq u'_{i+1}$, 3. the minimum squared Euclidean distance in the 3-dimensional output signal space is at least $d_3^2$ for the signal outputs corresponding to input ($u_i, u_{i+1}, u_{i+2}$) and ($u'_i, u'_{i+1}, u'_{i+2}$), if $u_i=u'_i$, $u_{i+1}=u'_{i+1}$, but $u_{i+2} \neq u'_{i+2}$.

4. furthermore, it holds that $d_1^2 < d_2^2 < d_3^2$.

Using Parity Codes for SSP Design

For practical applications, L(i)=1 for i=1, 2, .... In other words, subspaces are bisected into 2 smaller subspaces at each partition level. This on one hand simplifies the partitioning process; on the other hand, it facilitates the application of binary component codes when set partitioning is combined with multilevel coding, as will be explained later.

To partition the linear space $E^{m+L}$, a simple parity check code can be used for successive partitioning. Each subspace $W_i$ is partitioned by a parity check equation. The elements in $W_i$ are classified into two subspaces depending on whether the element satisfies the particular parity check equation enforced at that partition level. The partition procedure is best illustrated via the following example.

Figure 1B:
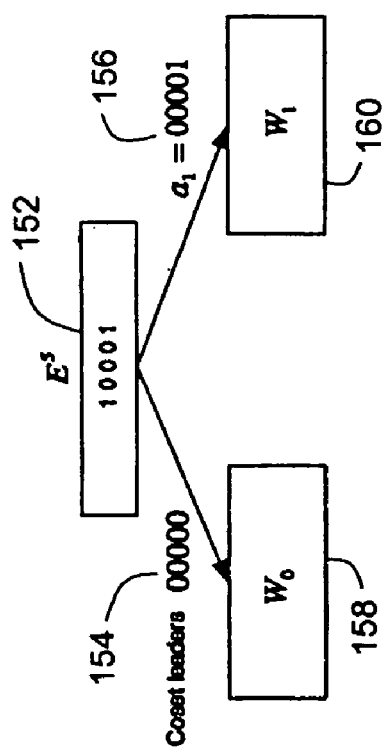
FIG. 1B illustrates a first level set partition for a PR channel [1 11 12].

FIG. 1B illustrates a first level set partition for PR channel with target response [1 11 12]. A 3-level structured set partition is made for the partial response target [1 11 12]. FIG. 1B shows the process of first level partition, where the parity check equation is given in the top box 152 and coset leaders 154, 156 are annotated in the respective branch. The PR channel has a memory of length m=2, which dictates the channel state is of length 2, i.e., $S^- \in E^2$. For a 3-level partition, the input is grouped into blocks of length 3, i.e., $S \in E^3$. Hence, the partition is performed on the complete space $E^5$. The parity check equation $h_1=[1\ 0\ 0\ 0\ 1]$ bisects the space $E^5$ into two subsets 158, 160, that are designated by $W_0$ and $W_1$ respectively. By using the notations from above, the basis subspace V (i.e., $W_0$) for the first level partition contains all the binary vectors $S^* \underline{\Delta} S^- \diamond S$ which satisfy the parity check equation. That is, $$W_0 = \{S^* | h_1 \cdot S^* = 0\}. \qquad \text{Equation 15}$$

As the coset leader for $W_1$ is given by $a_1=[0\ 0\ 0\ 0\ 1]$, the other coset on the first level partition is $$W_1 = \{S^* | h_1 \cdot S^* = h_1 \cdot a_1^T\}. \qquad \text{Equation 16}$$

Calculation verifies that the squared Euclidean distance between the signal points corresponding to $W_0$ and $W_1$ is at least 4. That is, $$d_1^2 = \min_{y,z} d(y \in T_0, z \in T_1) \geq 4 \qquad \text{Equation 17}$$

where $$T_0 = \{y=f(s), s \in W_0\} \text{ and } T_1 = \{z=f(s), s \in W_1\}. \qquad \text{Equation 18}$$

The next level of partition involves dividing $W_0$ and $W_1$ further into subsets, starting with $W_0$. A parity check equation $h_{2,0}=[0\ 1\ 0\ 1\ 0]$ is chosen to bisect $W_0$ into two subsets, depending on the parity check result is 0 or 1. Using the coset notion, vectors in the space $W_{0,0}$ satisfy $$W_{0,0} = \{S^* | h_{2,0} \cdot S^* = 0\} \qquad \text{Equation 19}$$

in addition to Equation 15. For subset $W_{0,1}$, it becomes $$W_{0,1} = \{S^* | h_{2,0} \cdot S^* = h_{2,0} \cdot a_2^T\} \qquad \text{Equation 20}$$

in addition to Equation 15. For ease of encoding/decoding, it is preferred to construct a set of parity check equations in a systematic format. To accomplish this, Gaussian elimination is adopted during the set partition construction if necessary. In this case, $h_1$ and $h_{2,0}$ are already in systematic form and no Gaussian elimination is needed.

Figure 2:
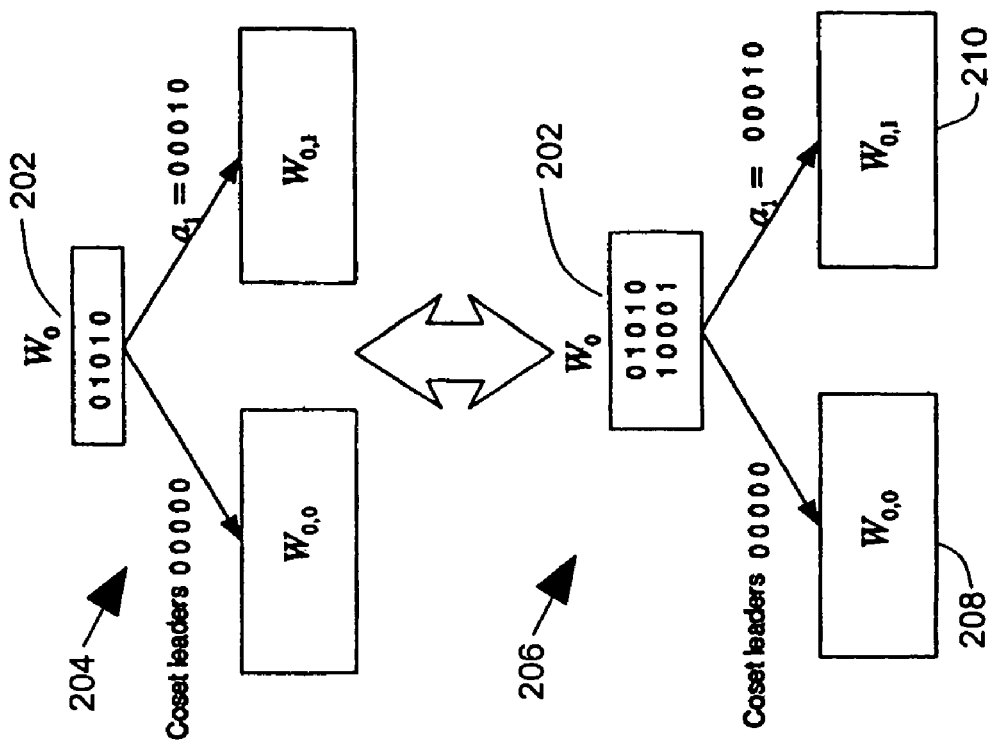
FIG. 2 illustrates a second level set partition for $W_0$ for a PR channel [1 11 12].

FIG. 2 illustrates a second level set partition for $W_0$ 202 for PR channel [1 11 12]. FIG. 2 illustrates the two equivalent forms 204, 206 of partition for $W_0$. The bottom half of FIG. 2 (at 206) contains the two parity check equations and associated coset leaders to arrive at $W_{0,0}$ at 208 and $W_{0,1}$ at 210 from $E^5$.

Figure 3:
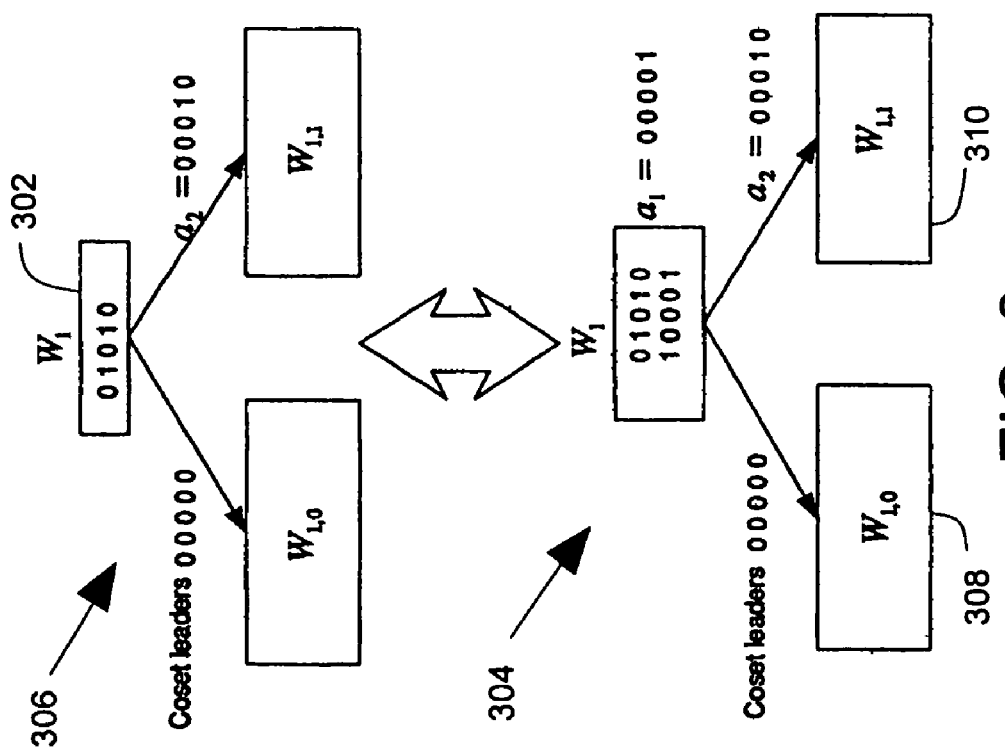
FIG. 3 illustrates a second level set partition for $W_1$ for a PR channel [1 11 12].

FIG. 3 illustrates a second level set partition for $W_1$ at 302 for PR channel [1 11 12]. The bottom partition 304 is an equivalent representation of the top partition 306 in a systematic form.

Similarly, $W_1$ can be partitioned into two subsets $W_{1,0}$ at 308 and $W_{1,1}$ at 310, as illustrated in FIG. 3. The only difference from the partition of $W_0$ is that the coset leaders $a_1$ corresponding to $W_1$ is [0 0 0 0 1], in contrast to all-zero vector for $W_0$. Define $$T_{i,j} = \{y = f(s), s \in W_{i,j}\}, \quad i,j=0,1 \qquad \text{Equation 21}$$

It holds that $$d_2^2 = \min_{i} \min_{j,h, j \neq h} \min_{y,z} d(y \in T_{i,j}, z \in T_{i,h}) \geq 408. \qquad \text{Equation 22}$$

The inter-subset squared Euclidean distance grows from $d_1^2=4$ on the first level to $d_2^2=408$ on the second level, providing a good distance spectrum for multilevel encoding, as explained in more detail below.

Figure 4:
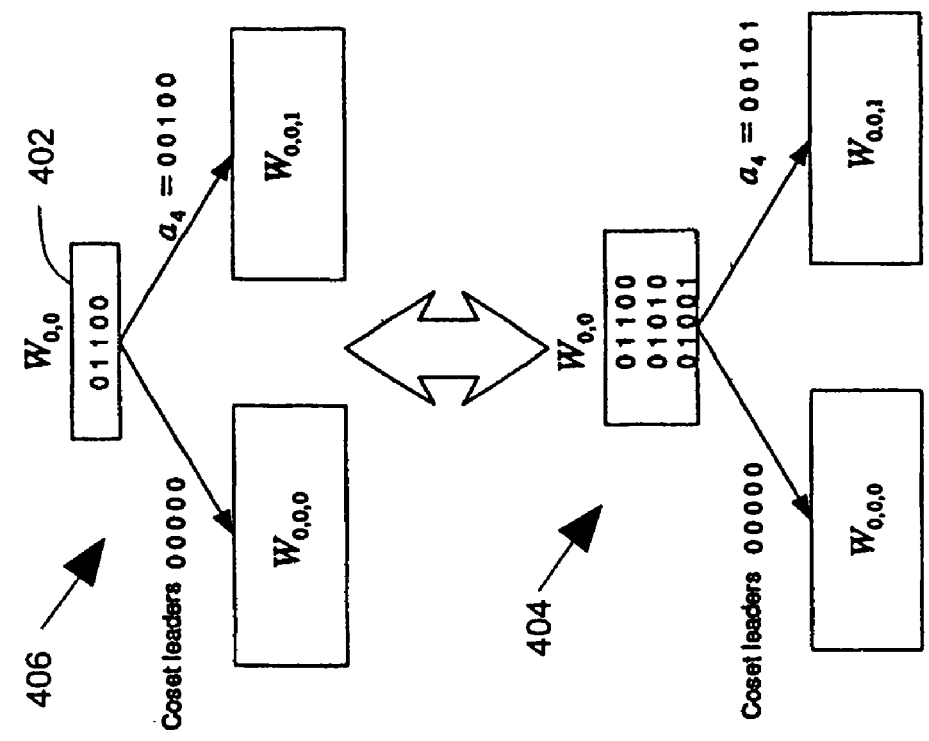
FIG. 4 illustrates third level set partition for $W_{0,0}$ of PR channel [1 11 12].

FIG. 4 illustrates third level set partition for $W_{0,0}$ at 402 for PR channel [1 11 12]. The bottom partition 404 is an equivalent representation of the top partition 406 in systematic form.

It is a straightforward repetition of the above procedures to further partition the subsets $W_{0,1}$, $W_{1,0}$, and $W_{1,1}$ into smaller subsets. The following description applies to partition of $W_{0,0}$. The parity check equation and its equivalent form for partitioning $W_{0,0}$ is depicted in FIG. 4. Depending on whether $s^*$ satisfies the parity check equation $$h_3 \cdot (s^*)^T = 0 \qquad \text{Equation 23}$$

the subspace $W_{0,0}$ is partitioned into $W_{0,0,0}$ and $W_{0,0,1}$ with $$W_{0,0,1} = W_{0,0,0} \oplus a_4 \qquad \text{Equation 24}$$

where $h_3=[0\ 1\ 1\ 0\ 0]$ and $a_4=[0\ 0\ 1\ 0\ 0]$. Hence, the equivalent parity check matrix becomes $$H_{3,0} \triangleq \begin{vmatrix} h_3 \\ h_2 \\ h_1 \end{vmatrix} = \begin{vmatrix} 0 & 1 & 1 & 0 & 0 \\ 0 & 1 & 0 & 1 & 0 \\ 1 & 0 & 0 & 0 & 1 \end{vmatrix}. \qquad \text{Equation 25}$$

The associated coset leader for $W_{0,0,1}$ is $a_4=[0\ 0\ 1\ 0\ 0]$.

The partition of $W_{0,1}$, $W_{1,0}$ are the same as $W_{0,0}$. However, partition of $W_{1,1}$ is different. The corresponding parity check equation is instead $$h'_3 \cdot (s^*)^T = 0, \qquad \text{Equation 26}$$

and the associated coset leader remains $a_4=[0\ 1\ 0\ 0]$.

Figure 5:
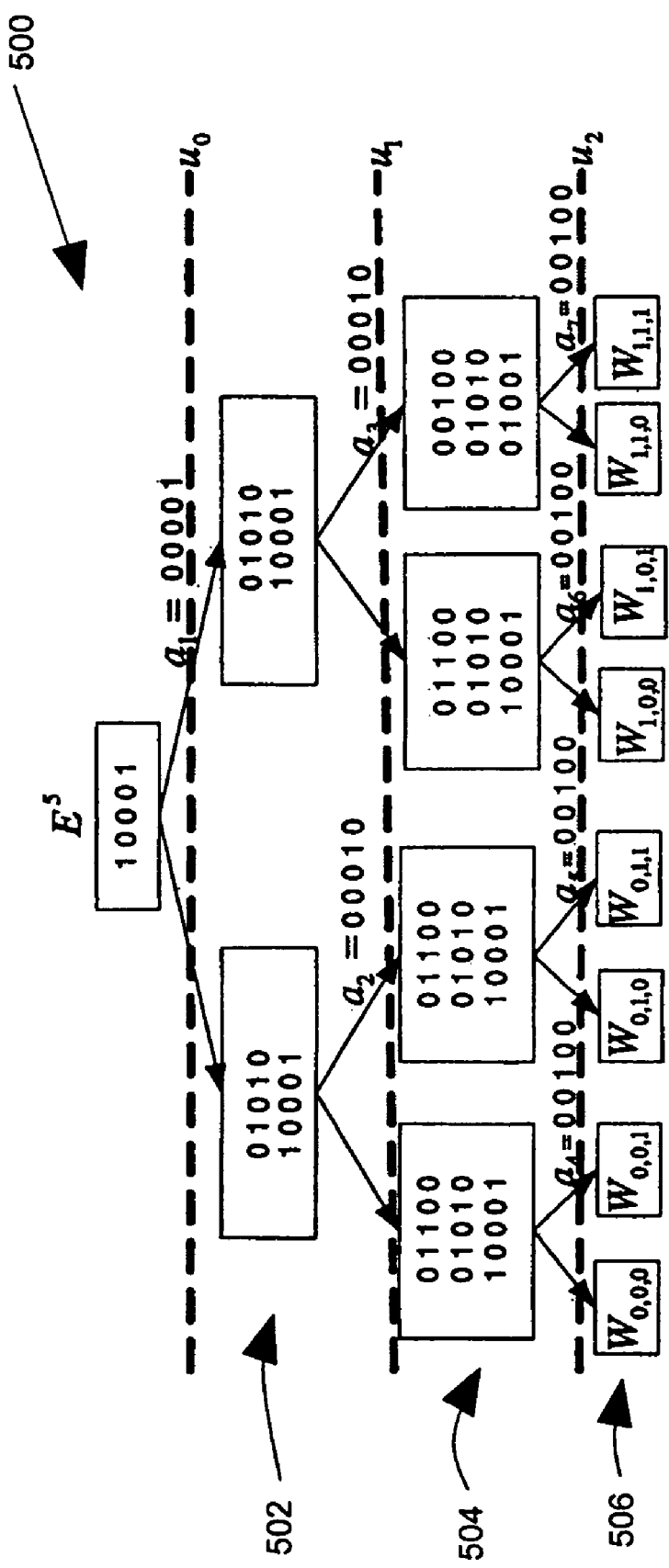
FIG. 5 illustrates a three level structured set partition for PR channel [1 11 12].

FIG. 5 illustrates a three level structured set partition 500 for PR channel [1 11 12]. Let $$T_{i,j,h} = \{y=f(s), s \in W_{i,j,h}\}, \quad i,j,h=0,1 \qquad \text{Equation 27}$$

and $$d_3^2 = \min_{i,j} \min_{g,h,g \neq h} \min_{y,z} d(y \in T_{i,j,g}, z \in T_{i,j,h}). \qquad \text{Equation 28}$$

it can be shown that with the complete 3-level partition 500, it holds that $$d_3^2 \geq 1064 > d_2^2 \geq 328 > d_1^2 = 4. \qquad \text{Equation 29}$$

Therefore, $\{d_1^2=4, d_2^2=328, d_3^2=1064\}$ is the hierarchy of minimal squared Euclidean distances for the 3-level set partition 500.

Given a channel state $s^-=s_{-1}, s_{-2}$ and a block of input $u=(u_i, u_{i+1}, u_{i+2})$ of length 3, the input sequence can be encoded such that $u_i$ represents the least significant bit which has a minimum squared Euclidean distance $d_1^2$ while $u_{i+2}$ represents the most significant bit which has a minimum squared Euclidean distance $d_3^2$. This is possible by assigning the branch label of the SSP at the first level 502, the second level 504 and third-level 506 in FIG. 5 to $u_0$, $u_1$ and $u_2$, respectively. Let $$H \triangleq \begin{vmatrix} 0 & 1 & 1 & 0 & 0 \\ 0 & 1 & 0 & 1 & 0 \\ 1 & 0 & 0 & 0 & 1 \end{vmatrix} = [H_s, I], \qquad \text{Equation 30}$$

$$H_s = \begin{vmatrix} 0 & 1 \\ 0 & 1 \\ 1 & 0 \end{vmatrix}, \qquad \text{Equation 31}$$

$$H' \triangleq \begin{vmatrix} 0 & 0 & 1 & 0 & 0 \\ 0 & 1 & 0 & 1 & 0 \\ 1 & 0 & 0 & 0 & 1 \end{vmatrix} = [H'_s, I], \qquad \text{Equation 32}$$

$$H'_s = \begin{vmatrix} 0 & 0 \\ 0 & 1 \\ 1 & 0 \end{vmatrix}, \qquad \text{Equation 33}$$

$$A \triangleq \begin{vmatrix} a_1 \\ a_2 \\ a_4 \end{vmatrix} = \begin{vmatrix} 0 & 0 & 0 & 0 & 1 \\ 0 & 0 & 0 & 1 & 0 \\ 0 & 0 & 1 & 0 & 0 \end{vmatrix} = [0\ A_s] \qquad \text{Equation 34}$$

$$A_s = \begin{vmatrix} 0 & 0 & 1 \\ 0 & 1 & 0 \\ 1 & 0 & 0 \end{vmatrix}. \qquad \text{Equation 35}$$

Note that rows of A are coset leaders at the 1st, 2nd and 3rd levels of partition. From FIG. 5, the encoding from $\{u_0, u_1, u_2\}$ to the channel bits $\{s_0, s_1, s_2\}$ can be verified to take the form $$[s_0 s_1 s_2] = [s_{-2} s_{-1}] \cdot H_s^T \oplus [u_0 u_1 u_2] \cdot A_s \text{ if } \overline{u_0 \& u_1}=1 \qquad \text{Equation 36}$$

and $$[s_0 s_1 s_2] = [s_{-2} s_{-1}] \cdot H'^T_s \oplus [u_0 u_1 u_2] \cdot A_s \text{ if } u_0 \& u_1 = 1 \qquad \text{Equation 37}$$

The encoding of Equations 36, 37 can be simplified to $$s_0 = (s_{-1} \& \overline{(u_0 \& u_1)}) \oplus u_2 \qquad \text{Equation 38}$$

$$s_1 = s_{-1} \oplus u_i \qquad \text{Equation 39}$$

$$s_2 = s_{-2} \oplus u_0 \qquad \text{Equation 40}$$

Correspondingly, the decoder can be implemented by the following logic $$u_0 = s_{-2} \oplus s_2 \qquad \text{Equation 41}$$

$$u_1 = s_{-1} \oplus s_1 \qquad \text{Equation 42}$$

$$u_2 = (s_{-1} \& \overline{(s_{-2} \oplus s_2) \& (s_{-1} \oplus s_1)}) \oplus s_0 \qquad \text{Equation 43}$$

For the given example, the encoding and decoding for coded modulation is very simple.

In general, when the target length becomes long (>3) and partition level increases, the encoding and decoding logic may become more complex. Under such cases, the endec can be realized via table look-up. Table 1 shows one possible structure of the encoding and decoding look-up table. Encoding can be executed as follows:

1. Find the current channel state $S^-$ from the encoder output as a result of last block of input;
2. Locate the entrance corresponding to the channel state $S^-$ in the ENDEC table.
3. Find the row in the ENDEC table whose "User Bits" column contains the current input data block;
4. The encoding output is the entrance under "Channel Bits".

The decoding operation can be performed in a similar way. The only difference is that the "input" is "Channel Bits" and the output becomes "User Bits".

TABLE 1

ENDEC look-up table

| Channel State $S^-$ | User Bits $(u_0, u_1, u_2, \ldots)$ | Channel Bits $(s_0, s_1, s_2, \ldots)$ |
|---|---|---|
| 00 . . . | 000 . . . | 000 . . . |
|  | 001 . . . | 101 . . . |
|  | . . . | . . . |
| 01 . . . | 000 . . . | 010 . . . |
|  | . . . | . . . |
| 10 . . . | 000 . . . | 100 . . . |
|  | . . . | . . . |
| 11 . . . | 000 . . . | 110 . . . |
| . . . | . . . | . . . |
| . . . | . . . | . . . |

After encoding, the (noise free) channel outputs for a block of input $(u_0, u_1, u_2)$ possess the following properties:

1. the minimum squared Euclidean distance $d_1^2$ in the 3-dimensional output signal space is at least 4 for the signal outputs corresponding to input $(u_0, u_1, u_2)$ and $(u'_0, u'_1, u'_2)$, if $u_0 \neq u'_0$;
2. the minimum squared Euclidean distance $d_2^2$ in the 3-dimensional output signal space is at least 408 for the signal outputs corresponding to input $(u_0, u_1, u_2)$ and $(u'_0, u'_1, u'_2)$, if $u_0 = u'_0$, but $u_1 \neq u'_1$;
3. the minimum squared Euclidean distance $d_3^2$ in the 3-dimensional output signal space is at least 1064 for the signal outputs corresponding to input $(u_0, u_1, u_2)$ and $(u'_0, u'_1, u'_2)$, if $u_0 = u'_0$, $u_1 = u'_1$, but $u_2 \neq u'_2$.

Multilevel Coding with SSP for PR Channels

Via proper set partitioning, user information bits can contain different levels of significance. For example, for 3-level SSP, a block of user bits $(u_0, u_1, u_2)$ have 3 different levels of error probability if there is no other outer coder imposed besides SSP. After SSP, the first bit $u_0$ has the least significance and it is more prone to error than $u_1$ and $u_2$. The last bit $u_2$ has the most significance and it is more immune to error than both $u_0$ and $u_1$. The gist of multilevel coding is to protect each bit $u_i$ differently via individual binary code $C^i$ according to their significance.

Figure 6:
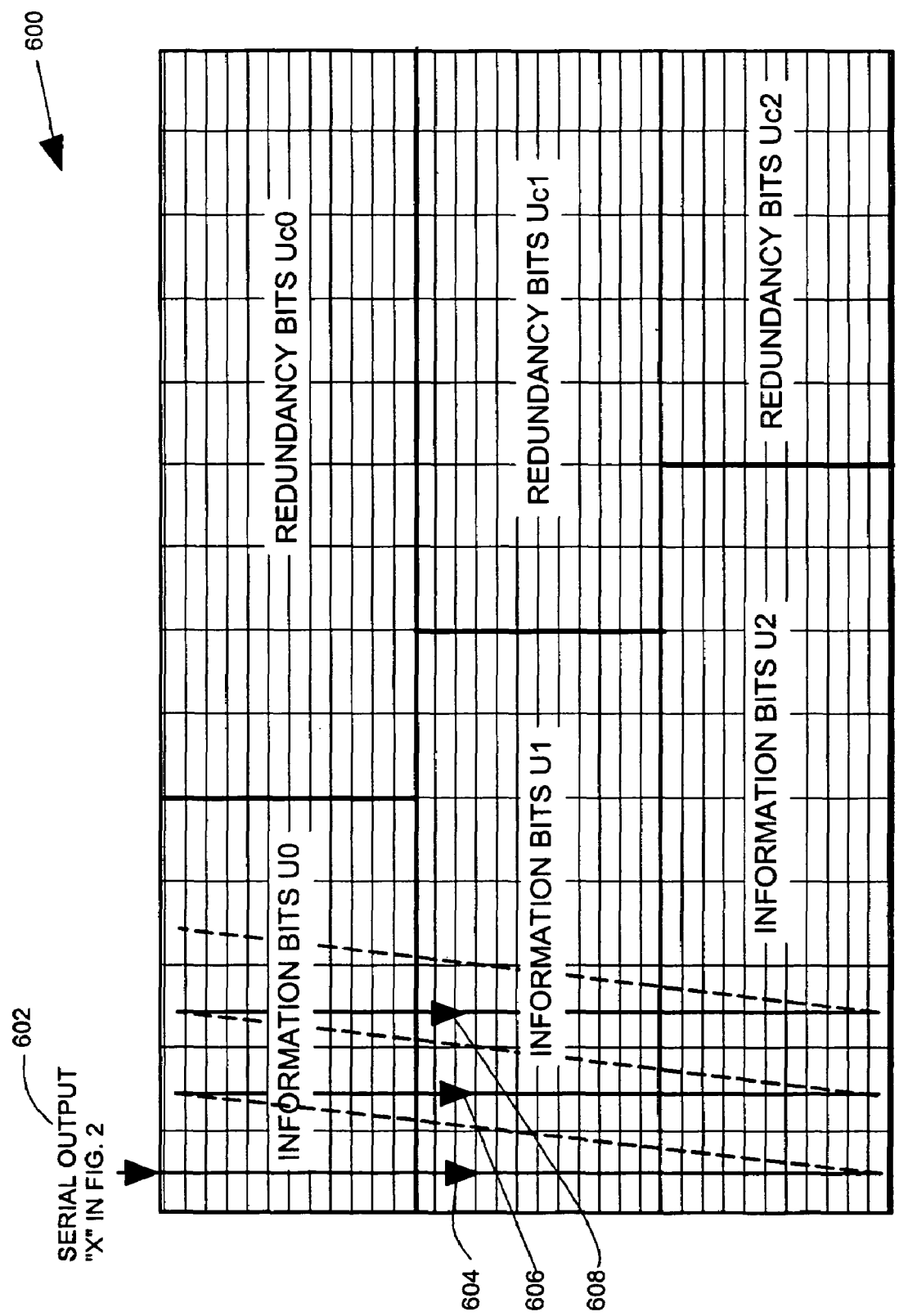
FIG. 6 illustrates a three level structured set partition with general multilevel coding.

FIG. 6 illustrates a three level structured set partition 600 with general multilevel coding. Coded bits 602 are transmitted column-wise to the channel. In this coding structure, there are 3 different codes (denoted by $C^0$, $C^1$ and $C^2$, respectively), which are used to encode the bits in the first level ($U_0$), the second level ($U_1$) and the third level ($U_2$) respectively. The generated redundancy bits $U_{c0}$, $U_{c1}$ and $U_{c2}$ are concatenated with information bits $u_0$, $u_1$ and $u_2$ respectively. Subsequently, a block of 3 bits is formed by taking one bit from $(U_0, U_{c0})$, $(U_1, U_{c1})$ and $(U_2, U_{c2})$ sequentially, as indicated by the arrows 604, 606, 608 in FIG. 6. The block of 3 bits are now encoded by the SSP logic, the result of which are transmitted to the recording circuitry. In retrospect, the bits in $(U_0, U_{c0})$, $(U_1, U_{c1})$ and $(U_2, U_{c2})$ experience monotonically increasing reliability during transmission due to SSP; however, the unequal error probability at different partition levels is balanced via different outer codes applied upon $(U_0, U_{c0})$, $(U_1, U_{c1})$ and $(U_2, U_{c2})$.

From the system level, one can consider the combined SSP and MLC process as a code C, which operates on block of information bits $U_0, U_1$ and $U_2$. The code rate R of the code C is given by $$R = (r_0 + r_1 + r_2)/3 \qquad \text{Equation 44}$$

where $r_o$, $r_1$ and $r_2$ are the code rate of code $C^0$, $C^1$ and $C^2$ respectively. In general, for an L-level SSP and MLC, the overall code rate is given by $$R = (l(0)k_0 + l(1)k_1 + \ldots + l(L-1)k_{L-1})/N. \qquad \text{Equation 45}$$

Here, $2^{l(i)}$, $i = 0, \ldots, L-1$ are the number of subspaces at the i-th level originating from a single subspace at the (i−1)-th level; $k_i$, $i = 0, \ldots, L-1$ are the number of $q_i = 2^{l(i)}$-ary information symbols of the code $C^i$; N is the total n in a codeword. The minimum distance of code C observes the following lower bound. If the structured set partition has a minimum squared Euclidean distance spectrum $\{d_0^2 < d_1^2 < \ldots < d_{L-1}^2\}$, then the minimum squared Euclidean distance $d^2(C)$ of the L-level concatenated code C satisfies the lower bound $$d^2(C) \geq \min\{d_0^2 D_0, d_1^2 D_1, \ldots, d_{L-1}^2 D_{L-1}\}, \qquad \text{Equation 46}$$

where $D_i$ is the minimum Hamming distance of the i-th level code $C^i$, $i = 0, 1, \ldots, L-1$.

Figure 7:
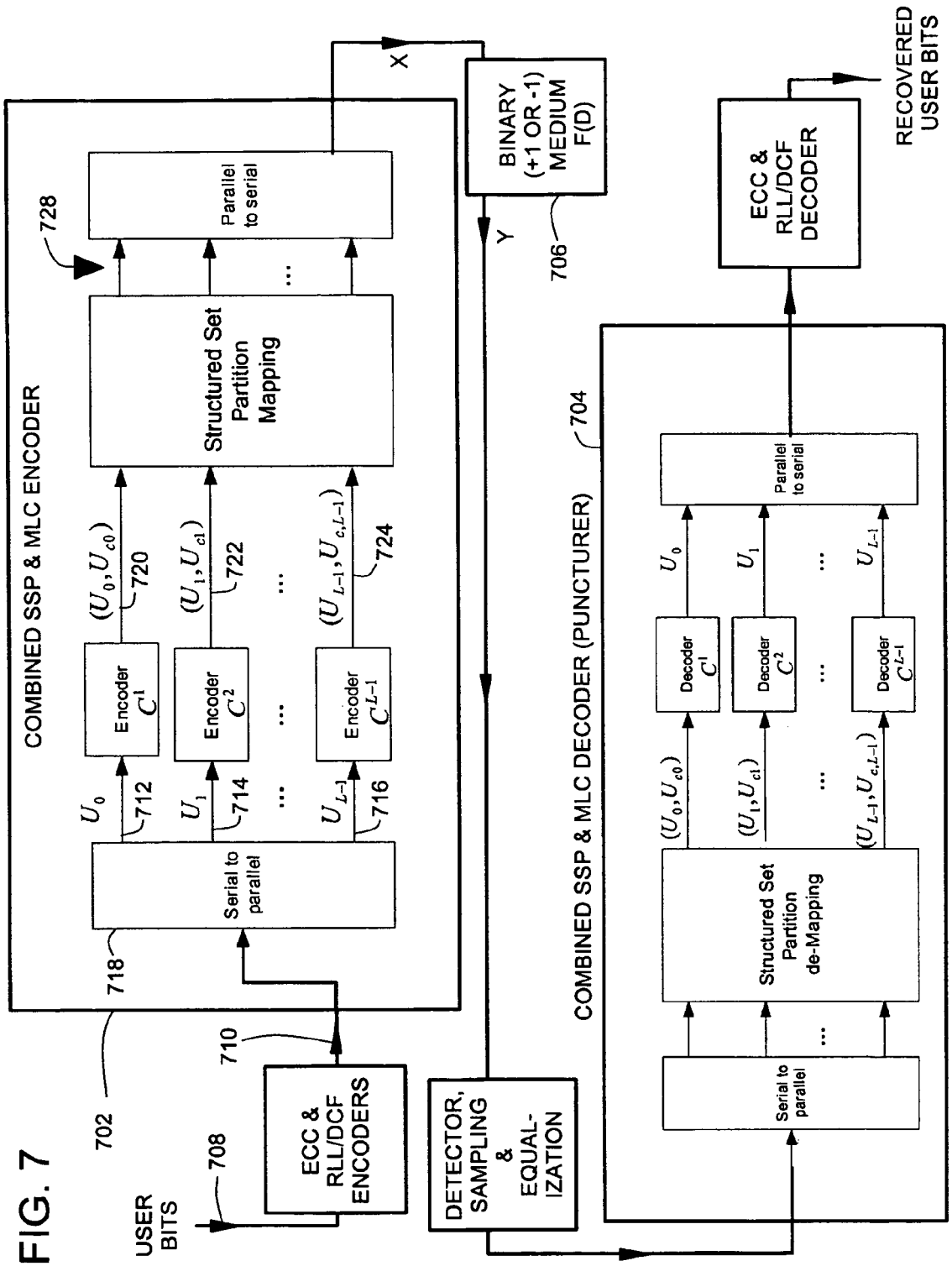
FIG. 7 illustrates multilevel encoding and decoding with structured set partitioning.

FIG. 7 illustrates multilevel encoding and decoding with structured set partitioning. An encoder 702 and a decoder 704 for MLC with SSP are illustrated coupled to a binary saturated communication medium 706 such as a data storage disc in a disc drive. User data at 710 is first converted to L parallel branches 712, 714, . . . , 716 by a serial to parallel converter 718. Each branch of data 712, 714, . . . , 716 is encoded by the component encoder $C^i$ at 720, 722, 724. The outputs of the component encoder $C^i$ 720, 722, 724 are mapped by the set-partition logic 726 for signal modulation. Finally, the mapped data 728 are converted back to serial form X and transmitted to the medium 706. The decoding operation in decoder 704 takes in place in the reverse order of encoding.

The selection of component codes for multilevel encoding after SSP is important. One important aspect is the assignment of code rates to the individual coding levels. Based on various information-theoretical parameters, such as capacity and coding exponent, of each equivalent channel at individual partition level, various design rules are established. For partial response channels, the most relevant design rule is the balanced distances rule. The rule states that the component codes can be chosen such that $$d_i^2 \cdot D_i = \text{constant}, i=0, \ldots, L-1,\quad\quad\text{Equation 47}$$

where $d_i^2$ is the squared Euclidean distance between cosets as defined before and $D_i$ is the Hamming distance of the component code at the i-th partition level. To limit the decoding and implementation complexity, this example is limited to simple parity check codes. Other more sophisticated codes, however, can also be used.

SSP for Noise Predictive Channels

Magnetic recording channels experience electronics noise and medium noise, among many other system disturbances. When channel normalized density is low, an appropriately chosen generalized PR (GPR) target can achieve near optimal performance with minimum noise enhancement due to channel equalization. GPR system can be alternatively implemented as noise predictive maximum likelihood (NPML). Comparing to direct GPR implementation, NPML facilitates circuit implementation of equalization and Viterbi detection (or its sub-optimal variants like post-processing). To account for medium noise, which is known to be data dependent, NPML detection can be extended to be data dependent, giving rise to the so-called pattern-dependent noise predictive (PDNP) detection. PDNP detectors utilize data dependent noise whitening filters to account for the data-dependence of medium noise during Viterbi detection. While it demands more complexity than NPML detectors, PDNP detectors offer significant performance improvement over NPML when medium noise becomes dominant.

For SSP, noise predictive detection provides another advantage. In particular, the realizable distance spectrum of coded modulation systems is closely related to specific channel response, i.e., nominal targets. By employing PDNP or NPML detection, one gains flexibility in choosing front-end equalization target that has good distance spectrum for structured set partition. However, it should be pointed out that the equalization target is not the effective target for Viterbi detection if noise prediction is involved. Indeed, it is not difficult to show that the effective targets translate into the convolution of the equalization target with the noise whitening filter(s). For PDNP detectors, effective targets become data dependent. To design the optimal SSP for data dependent targets, however, turns out to be computationally prohibitive and it provides little insight into the problem. Here, an ad-hoc method is used, where various "extended" targets are tested with SSP and subsequently BER and SFR results are obtained and compared in order to find a "good" SSP.

An approach to find a good SSP for PDNP detectors is described below:

1. At a desired operating point, find the noise whitening filters for a given front-end equalization target.

2. Convolve the equalization target and noise whitening filters and obtain effective detection target(s).

3. Choose an "experimental target" that is close to the effective detection targets for SSP design.

4. Find a good SSP for the experimental target via an iterative process, where for a predefined distance spectrum an exhaustive search is performed by computer for SSP. The exhaustive search is possible due to the fact that for practical applications, dimensions are limited to a manageable range, e.g., 6. If for a predefined distance spectrum an SSP can be found, the distance spectrum is further increased until there is no SSP can be found. The last available partitioning and the associated spectrum are then employed for SSP encoding.

SSP with Parity Multilevel Encoding

Recording channels suffer signal-to-noise ratio degradation approximately proportional to $R^2$, in contrast to R for other communication channels. Here, R is the overall code-rate. Hence, high-rate codes are favored in recording channel applications. If SSP/MLC are employed, there exist various choices for component codes at each individual partition level. The detailed discussion here is limited to simple parity check codes as component codes. In particular, single parity check codes are employed for the bits having the smallest squared Euclidean distances as a result of SSP. This group of bits are most prone to error due to the shortest distance between the corresponding cosets. Bits that correspond to lower partition levels are left uncoded. The reasons to adopt such a coding structure can be summarized as in the following:

1. Single parity codes are suitable for maximum-likelihood (ML) sequence detection without incurring significant complexity increase for inter-symbol interference channels. For block parity codes, each additional parity check equation implies doubling the trellis size for ML detection. Hence, single parity block codes are used for a practical implementation.

2. Single parity codes can have very high code rate. For code-rate sensitive recording channels, high code-rate is often preferred. In addition, the error statistics of single parity check codes are more compatible to outer Reed-Solomon codes from a sector-failure-rate perspective.

To apply SSP/MLC to recording channels, there are many other issues that need to be properly taken care of. One important issue is the compatibility of SSP mapping with other channel codes such as run-length limited (RLL) codes, DC-free (DCF) codes and so forth. These constrained codes are necessary for read channel system to work properly. At a first glance, it seems that SSP conflicts with other channel codes as SSP requires bits mapping which alters the property of the input sequence. However, as explained below, SSP can be made to co-exist with other channel codes via a technique dubbed "reverse coding". Secondly, in order to achieve and exploit good distance spectrum for SSP, typically up to 4 levels of set partition is desired for ISI channels. When SSP combined with channel memory, the trellis size often increases considerably, making SSP less attractive for practical application. As shown below, however, under most cases SSP can take advantage of the existing expanded trellis owing to noise prediction without demanding further trellis augmentation.

SSP Co-Existence with Other Constrained Codes Via Reverse Coding

Figure 8:
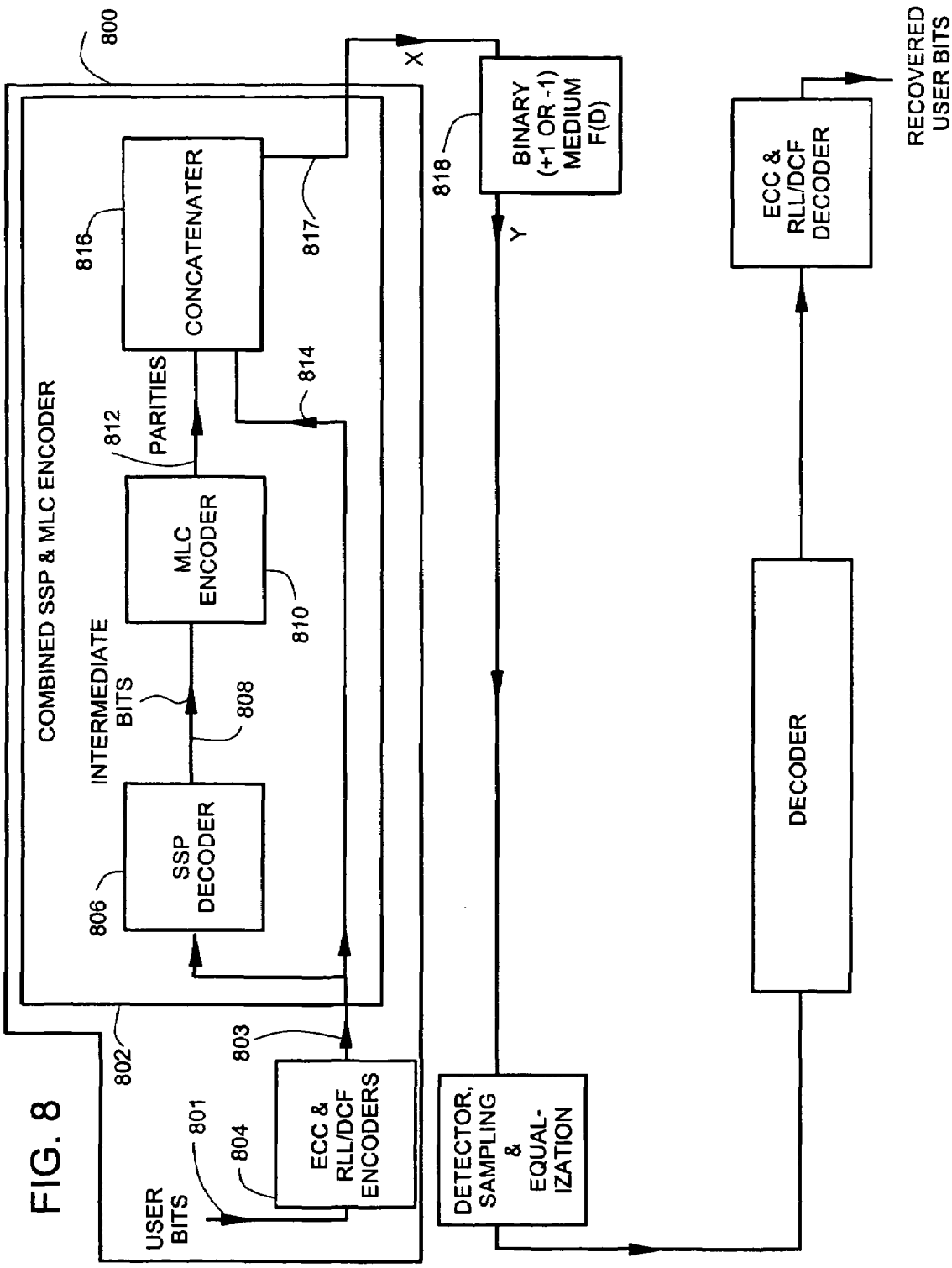
FIG. 8 illustrates a SSP/MLC encoder with minimum disturbances to other constrained code encoding.

FIG. 8 illustrates a SSP/MLC encoder 802 that results in minimum disturbances to other constrained code encoding such as ECC & RLL/DCF encoding at encoders 804. In FIG. 8, an encoder 800 for encoding user data 801 comprises a DC-free encoder 809 that receives a block of user data 801 and provides a block of DC-free encoded data output 803.

The encoder 800 comprises a rate-1 mapper 806 (also called SSP decoder 806) that receives the block of DC-free encoded output 803. The rate-1 mapper 806 performs a reverse mapping based on structured set partitioning, and provides an intermediate data sequence 808.

The encoder 800 comprises a multilevel encoder 810 that receives the intermediate data sequence 808 and that generates redundant bits 812 based on the intermediate data sequence 808.

The encoder 800 comprises a multiplexer 816 that concatenates the redundant bits 812 with the block of DC-free encoded data output 803. The multiplexer 816 provides an encoder output 817 that is encoded for transmission through a binary medium 818.

The DC-free encoder 804 preferably comprises a run-length-limited encoder. The rate-1 mapper 806 arranges the block of DC-free encoded data output into a first matrix form by rows and columns, and generates the intermediate data sequence arranged as a second matrix. The rate-1 mapper 806 uses a structured set partition of signals of an inter-symbol interference channel, and generates the second matrix with rows and columns that have differentiated reliabilities after transmission through in a noisy inter-symbol interference channel. The structured set partitioning preferably comprises multiple level partitioning of a linear space, and bisection of spaces into two subspaces at each partitioning level, where each subspace is a coset of the other subspace at the same partitioning level. The multilevel encoder generates redundant bits conforming to the differentiated reliabilities of the rows and columns of the intermediate data sequence, producing an optimized minimum Euclidean distance between output sequences of an inter-symbol interference channel. The concatenator 816 concatenates the redundant bits from multiple blocks of the DC-free encoded data outputs into a redundant bits sequence, and appends the redundant bits sequence to the multiple blocks of DC-free encoded data outputs and subsequently transmits output 817 to the medium 818.

SSP mapping essentially is a rate-1 encoder that maps the input bits into channel bits such that the input bits possess ordered error probability. The ordered (monotonically increasing intra-block) reliability is then balanced via levelled component codes. Viewed from a different angle, as long as the component codes operate on the bits that have ordered reliability, SSP with MLC is achieved. Such an interpretation provides a SSP/MLC encoding scheme as illustrated in FIG. 8.

During encoding, the user bits are first encoded by other constrained-code encoder such as RLL, DCF encoders 804. The encoded bits are then "decoded" by a SSP decoder 806. Since the RLL/DCF encoded bit sequence are directly transmitted to the channel, the SSP decoded bits ("intermediate bits") at 808 possess ordered reliability. In other words, these intermediate bits can be considered as the user bits $\{u_i\}$ as before, which are SSP encoded and subsequently transmitted to the channel. Hence, the MLC component codes provided by MLC encoder 810 can operate on the intermediate bit-sequence 808 to balance the error probability on individual partition levels. The redundancy bits (parity bits) 812 generated by the MLC encoder 810 are appended to the encoded bit sequence 814 by concatenater 816 for transmission to the medium 818. Via such an encoding scheme, minimum disturbance is resulted from the SSP/MLC "encoding" and the bit sequence can still satisfy the RLL/DCF constraint, which may be slightly relaxed due to the insertion of parity bits. In fact, via the encoder structure in FIG. 8, it is possible to integrate the RLL/DCF and SSP/MLC encoder in one entity without much difficulty. This technique is referred to here as "reverse encoding" where the encoding is actually realized via a dummy decoding operation of the channel bits.

Figure 9:
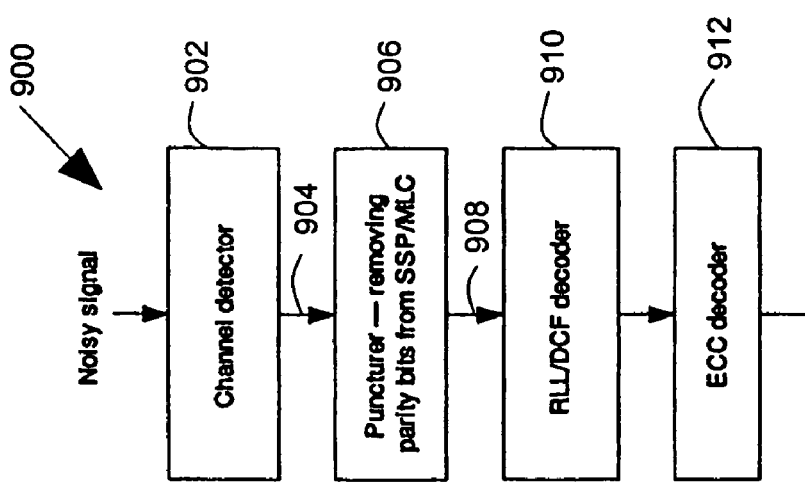
FIG. 9 illustrates a decoder for SSP/MLC and RLL/DCF that corresponds with the encoder of FIG. 8.

FIG. 9 illustrates a block diagram of a decoder for SSP/MLC and RLL/DCF. The corresponding encoder is illustrated in FIG. 8. A received (equalized) noisy signal is first processed by a channel sequence detector 902 and a detected bit sequence 904 is then punctured away from any parity bits generated during MLC encoding by puncturer 906. A punctured bit sequence 908 is subsequently decoded by the RLL/DCF decoder 910, followed by ECC decoding at ECC decoder 912. If single parity codes are used for MLC, the channel sequence detector is embedded with an SSP decoder since the parity is calculated on the decoded intermediate bits.

The decoder 900 comprises a channel detector 902 that provides an encoded user data output 904. The decoder 900 comprises a puncturer 906 that receives the encoded user data output 904. The puncturer removes parity bits, and provides a punctured data output 908. The decoder 900 comprises a DC-free decoder 910 that receives the punctured data output 908. The DC-free decoder 910 removes DC-free encoding, and providing a decoded user data output. The decoder 900 comprises an error-correction-code decoder 912 that receives the decoded user data output, removes errors, and provides an error-corrected user data output.

Figure 10:
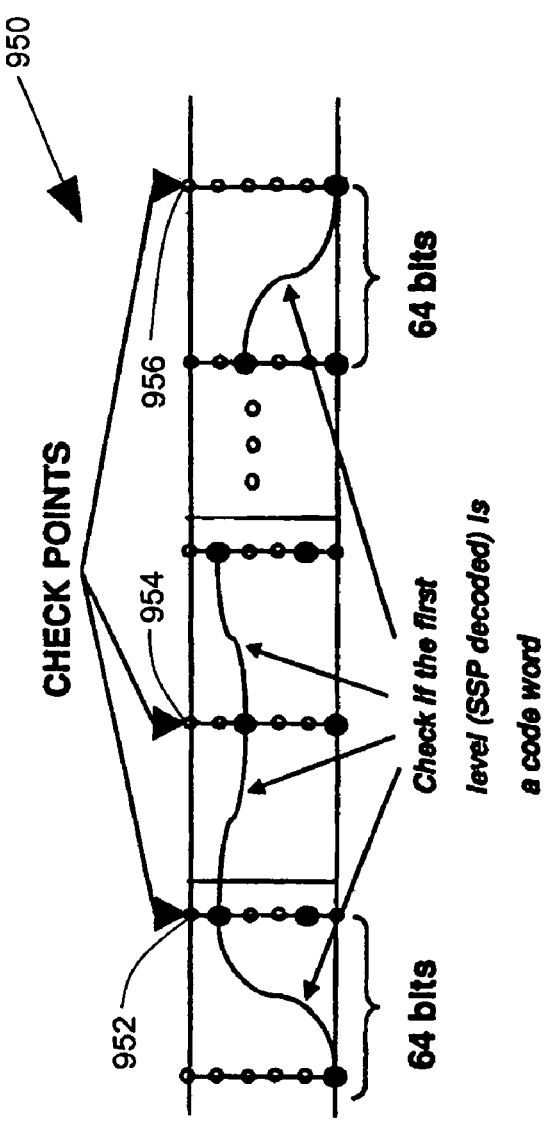
FIG. 10 illustrates a sequence detection for channel bits that are SSP/single parity encoded.

FIG. 10 illustrates a sequence detection for channel bits that are SSP/single parity encoded. The parity check equations are operated on the SSP decoded sequence (intermediate data sequence). In the diagram 950, an example of overall code-rate 63/64 single parity bit MLC code is shown. The SSP level is 4, and the single parity is operated only on the address bits of the first partition level. Once the sequence detector reaches the boundary of the parity check equation, the competing paths are examined to see if they belong to a codeword. This can be accomplished via first translating the path bits into decoded bits by an embedded SSP decoder, and then the parity equation is inspected. Competing paths that do not satisfy parity check equations are discarded at the check points 952, 954, 956 which coincide with the parity check boundaries. Other operations in diagram 950 are similar to conventional Viterbi algorithm, with the exception that noise prediction can be also embedded for branch metric calculation.

SSP for ISI Channel with Reduced Complexity

Consider an ISI channel of length m+1 staged with an SSP of level L. The corresponding signal space has a dimension m+L, where the set partition is operated. Consequently, the SSP encoding and decoding need to collect m+L user or channel bits at one time for appropriate operation. Such a requirement poses significant challenges for signal detection and ML decoding. Due to the presence of ISI as well as SSP memory, the transitions associated with the decoding trellis must collect m+L channel bits for decision-feedback free maximum-likelihood detection. As a result, the number of states for the decoding trellis is at least $2^{m+L-1}$. In addition to ISI and SSP, MLC encoding calls for additional trellis augmentation. In particular, with single parity check coding, the size of decoding trellis is twice that of the original size, i.e., with $2^{m+L}$ number of states. Under typical operating conditions, this amounts to 128 states for a the decoding trellis, making SSP/MLC less attractive for practical high-speed implementations. An empirical observation of SSP encoding/decoding which can be taken advantage of during implementation is described below.

Figure 11:
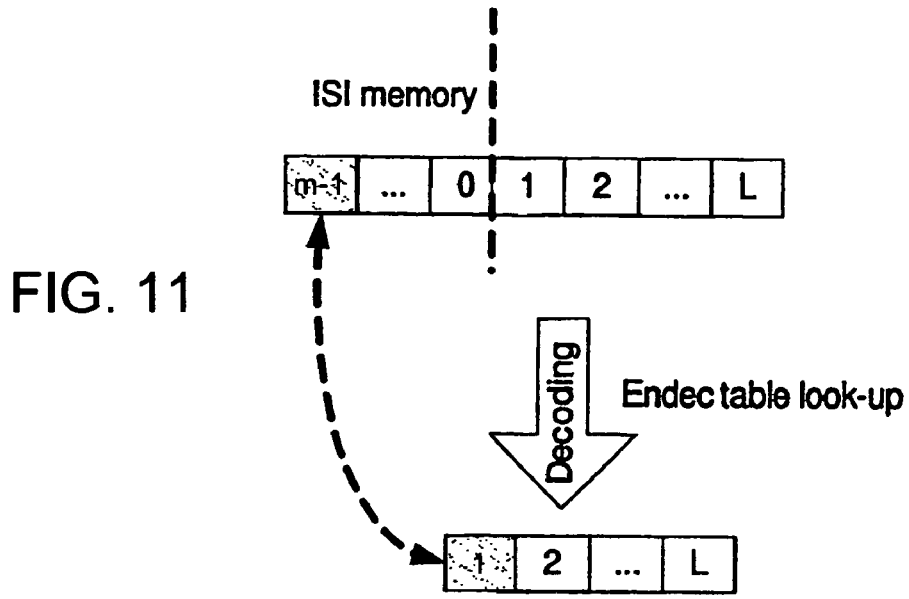
FIG. 11 illustrates SSP decoding in which the first bit on which the parity check equation is effective is independent of the m-th bit in the channel memory for most PR targets.

FIG. 11 illustrates a process during SSP decoding. A first bit on which the parity check equation is effective is independent of the m-th bit in the channel memory for most PR targets. The decoding trellis thus only requires $2^{m+L+1}$ number of states for ML decoding.

Single parity check codes as component codes for MLC are preferred, although other more sophisticated codes can be used. In particular, the single parity check is operated on the bits corresponding to the address bits at the first partition level, since these bits are most susceptible to error. In most practical applications, it can be verified via computer that the SSP decoding results of the bits at the first partition level are independent of the m-th bit in the memory. This relationship is explained in FIG. 11, which illustrates the SSP decoding operation with ISI memory m and partition level L. The SSP decoding is carried out by simply locating the coset corresponding to the channel bits and finding the corresponding address bits of the coset. The interesting property with SSP decoding is that, for most PR targets, the first bit after SSP decoding is independent of the m-th bit in the channel memory, both of which are shaded in FIG. 11. Since the parity check equation is only effective on the first bit, this implies that in fact one only needs to collect m+L−1 bits excluding the m-th bit in the memory for ML decoding. Consequently, the decoding trellis only requires $2^{m+L-1}$ number of states for an L-level SSP partition of an ISI channel of length m+1, comparing to an otherwise $2^{m+L}$ number of states.

EXAMPLE

Presented below is an SSP/MLC architecture for perpendicular recording read channels. In order for the application of SSP/MLC, the following constraints are accomplished from the complexity and system performance perspective:

1. ML decoding trellis size falls into a reasonable range, e.g., 32 states or 64 states;
2. SSP/MLC is compatible with RLL and DCF encoding;
3. Performance gain can be obtained at sector failure rate (SFR) level.

Investigation of SSP/MLC for recording channels suggests that an L=4 level SSP is usually desired for a balanced trade-off between performance and complexity. With a front-end equalization target of length m=3, such a configuration suggests a trellis size of $2^{m+L-1}=64$ states, excluding any other augmentation effect resulted from MLC. However, by applying the technique presented below, it is possible to reduce the number of states to 32 states when the component codes operate only on the bits at the first partition level. Consequently, it becomes possible to limit the total number of states for the detection trellis to 64 states by employing a single parity check code as component codes.

To account for the RLL/DCF constraint, the reverse coding technique described herein. With reverse coding, it is possible to concatenate SSP/MLC with RLL/DCF encoder in a straightforward manner, although at some cases the RLL/DCF constraint may be slightly altered due to the insertion of parity bits. With a more sophisticated design, it is possible to integrate SSP/MLC encoding with RLL/DCF. In the presentation below, the discussion is limited to concatenating SSP/MLC with an existing RLL/DCF encoder. The RLL/DCF encoder is considered as a "black-box" and SSP/MLC encoding is achieved in a concatenated manner regardless of how the RLL/DCF encoding is achieved. This facilitates the channel design process as one can separate the design of RLL/DCF from SSP/MLC, and consequently many existing RLL/DCF encoders can be utilized.

Figure 12:
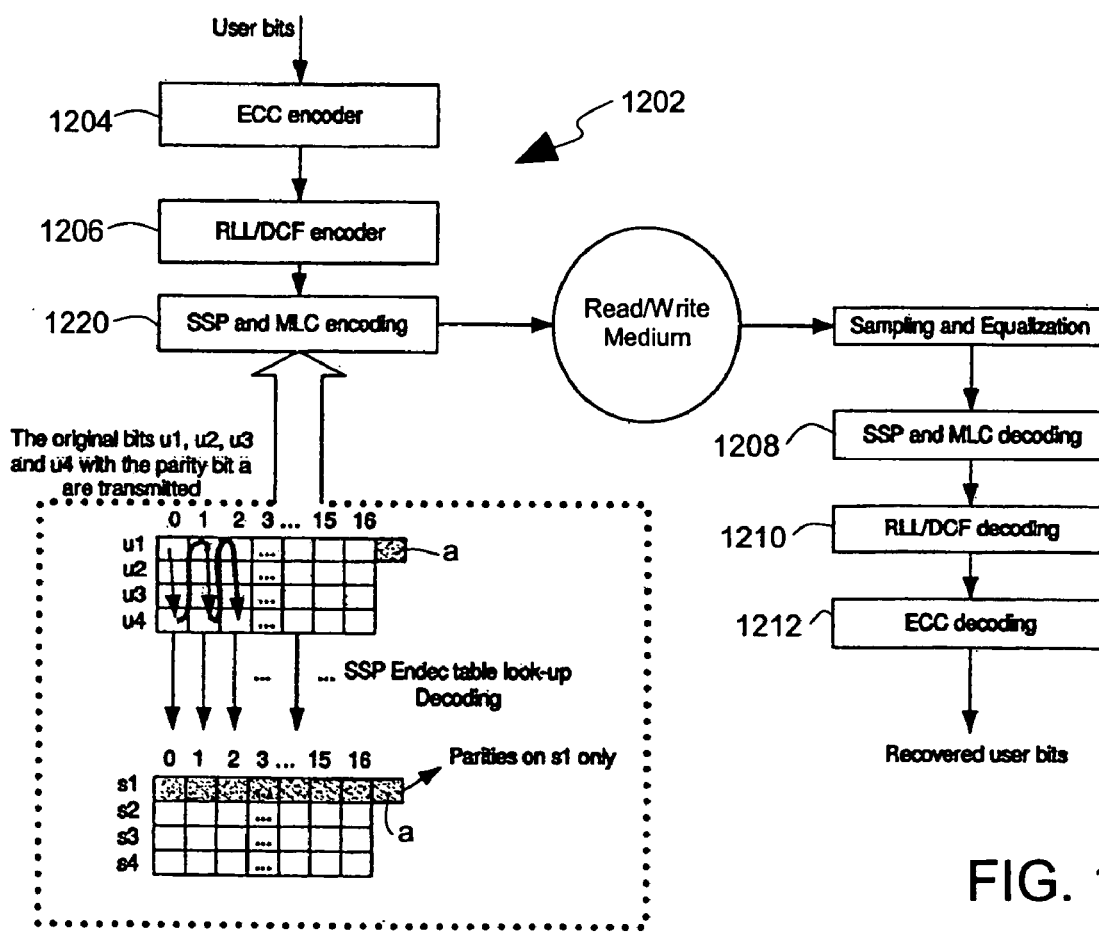
FIG. 12 illustrates an SSP/MLC coded system with ECC and RLL/DCF encoding.

FIG. 12 illustrates an SSP/MLC coded system 1202 with ECC encoding 1204 and RLL/DCF encoding 1206. Reverse coding technique is employed to preserve the RLL/DCF encoded sequence. The user bits are ECC encoded and subsequently subject to RLL/DCF encoding. The RLL/DCF encoded sequence is then again encoded by the SSP/MLC encoder 1202. As an example, the case of single parity as component codes after SSP is shown, where every 64 SSP decoded bits are appended with one single parity. As before, the single parity operates only on the first level of bits $\{s_1\}$. The computed parity bits $\{a\}$ are then inserted back into the RLL/DCF encoded sequence and subsequently this newly formed sequence is sent to the channel for recording. In the receiver side, SSP/MLC decoding at 1208 is implemented via a modified Viterbi with embedded pattern-dependent noise prediction. The Viterbi detector is similar to the one shown in FIG. 10. The detected bit sequence is then punctured where the SSP parity bit is removed and the re-assembled sequence is then decoded by the RLL/DCF decoder 1210 and ECC decoder 1212.

For the simulation results presented below, a blackbox RLL/DCF encoder is used which has a code rate of 60/62. In order to preserve the RLL/DCF codeword boundary, the single SSP parity is computed on the 15 bits at the first partition level corresponding to the SSP decoded first 60 bits for each RLL/DCF codeword, and the left 2 bits enters directly into the parity check equation. The effective target for SSP design is fixed at [1 10 13 3] for various operating points. Although it is possible to optimize the effective target for each operating point for improved performance, at the SFR level it is observed that such optimization provides limited further performance improvement.

To summarize, a channel coding architecture described above utilizes structured set partition (SSP) and multilevel coding (MLC), which is also called coded modulation. Structured set partition exploits the inherent structure of PR channel outputs and provides monotonically increasing Euclidean distance for the address bits labelling branches of the set partitioning tree. With the help of multilevel coding, the bits having smaller Euclidean distances are coded with larger Hamming distance component codes, hence component codes are potentially more efficiently employed. Consequently, the system minimum Euclidean distance and thus the performance can be improved. For magnetic recording channels, severe ISI and dominant medium noise consist the main system impairment source. Pattern-dependent noise predictive (PDNP) detection is an effective detection method for high-density recording channels. Due to noise prediction, the effective targets become different from the equalization target and they are data dependent. In turn, set partitioning for PDNP detection becomes more involved. Effective targets are obtained that are convolutional results of the equalization target and noise whitening filters. Subsequently, the SSP is designed according to an approximated and truncated version of the effective targets. Although the design rule with such an approach seems rather ad hoc, it provides effective improvement on the system performance under many operating conditions. To realize maximum-likelihood (ML) detection, complexity considerations limit the component codes selection for MLC in conjunction with SSP.

Parity codes are shown, although other more sophisticated codes can also be utilized. In particular, the cases are presented where single parity check equations are imposed only on the bits corresponding to labels at the first level of the set partitioning tree. Such a coding configuration confines the ML detection complexity while providing sound compatibility to outer RS code for recording channels. With SSP and single parity encoding, it is possible to obtain system performance gains over conventional single parity encoding where no SSP is involved at the sector failure level (SFR) for perpendicular recording channels. A major concern associated with coded modulation is the compatibility of SSP with other channel constrained encoding, such as run-length limited (RLL) and DC-free (DCF) encoding. A reverse coding technique is described to provide SSP/MLC encoding without violating other imposed constraints. The reverse coding technique attains the compatibility by creating dummy bits, which are the results of SSP decoding given an constrained input data sequence. The component codes operate on these dummy bits and the generated parities are transmitted along with the given input data sequence, hence producing minimum disturbances on the existing constraint. Indeed, it is even possible to integrate coded modulation encoding with RLL and DCF encoding. Such an integrated encoder can generate output bits satisfying a given desired constraint. It is possible to shrink the ML detection trellis size without incurring any system performance loss by observing the independence between the SSP encoded bits and some memory bits. In particular, under most cases of interest, the bits corresponding to the labelling bits on the first level of the set partition tree are independent of the "oldest" bit in the ISI memory. As a consequence, the trellis size can be reduced by half without incurring decision feedback for ML detection. Numerical simulations demonstrate that system performance gains can be obtained via MLC in conjunction with SSP, with minimum modifications to existing channel architectures. This is particularly true for perpendicular recording channels operating at high linear density experiencing dominated medium noise disturbances. Although the discussion is limited to simple parity check codes as component codes for coded modulation encoding, much more flexibility and potentially achievable gains can be expected by utilizing more powerful component codes in conjunction with SSP, including turbo codes, TPC, LDPC codes and the like and these codes can be treated as described herein.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the encoding and decoding system while maintaining substantially the same functionality without departing from the scope and spirit of the present invention. In addition, although the preferred embodiment described herein is directed to an encoding and decoding system for data storage devices, it will be appreciated by those skilled in the art that the teachings of the present invention can be applied to other binary communication channels, without departing from the scope and spirit of the present invention.

What is claimed is:

1. An encoder for user data, comprising:
    a DC-free encoder receiving a block of user data and providing a block of DC-free encoded output;
    a rate-1 mapper that receives the block of DC-free encoded output, performs a reverse mapping based on structured set partitioning, and generates an intermediate data sequence;
    a multilevel encoder that receives the intermediate data sequence and that generates redundant bits based on the intermediate data sequence; and
    a multiplexer that concatenates the redundant bits with the block of DC-free encoded output and provides an encoder output that is encoded for transmission through a channel.

2. The encoder of claim 1 wherein the DC-free encoder comprises a run-length-limited encoder.

3. The encoder of claim 1 wherein the rate-1 mapper arranges the block of DC-free encoded output into a first matrix form by rows and columns, and generates the intermediate data sequence arranged as a second matrix.

4. The encoder of claim 3 wherein the rate-1 mapper uses structured set partitioning of signals of an inter-symbol interference channel, and generates the second matrix with rows and columns that have differentiated reliabilities after transmission through a noisy inter-symbol interference channel.

5. The encoder of claim 4 wherein the structured set partitioning comprises multiple partitioning levels, wherein a lower level partition further partitions linear subspaces and cosets of a higher level partition into smaller linear subspaces and cosets.

6. The encoder of claim 4 wherein the multilevel encoder generates redundant bits corresponding to rows or columns of the matrix of intermediate bits with differentiated reliabilities, producing an optimized minimum Euclidean distance between output sequences of an inter-symbol interference channel.

7. The encoder of claim 1 wherein the multiplexer concatenates the redundant bits generated by the multilevel encoder from intermediate bits of the DC-free encoded data to the original DC-free encoded data and subsequently transmits them to the channel.

8. A decoder for user data, comprising:
    a channel decoder receiving equalized samples, and providing estimates of MLC encoded bits;
    a multilevel decoder receiving the MLC encoded bits and providing an MLC decoded output utilizing constraints imposed by multilevel decoding of the equalized samples; and
    a combined ECC and DC-free decoder receiving the MLC decoded output, the combined ECC and DC-free decoder removing DC-free encoding, and providing a decoded user data output.

9. The decoder of claim 8, further comprising:
    a sequence detector providing estimates of intermediate bits based on the received equalized samples; and
    a mapper mapping the decoded intermediate bits to the DCF decoded bits based on structured set partitioning.

10. The decoder of claim 9 wherein the multilevel decoder comprises a serial-to-parallel converter that converts the intermediate bits to parallel format for MLC decoding, and a parallel-to-serial converter that converts the MLC decoded bits from parallel to serial.

11. The decoder of claim 10 wherein the multilevel decoder comprises a plurality of MLC decoders that receive the parallel outputs from the serial-to-parallel converter and output decoded intermediate bits to the parallel-to-serial converter.

12. The decoder of claim 8, wherein the channel decoder comprises a sequence detector operating on a channel trellis with trellis states comprising the DCF coded bits, and memory storing intermediate bits mapped from the trellis states using structured set partitioning.

13. The decoder of claim 12, wherein the sequence detector comprises an add-compare-select block utilizing constraints imposed by multilevel coding on intermediate bits for selection of surviving paths in the channel trellis.

14. A method of encoding user data, comprising:
receiving a block of user data and providing a block of DC-free encoded data;
performing a reverse rate-1 mapping of the block of DC-free encoded data based on structured set partitioning, and providing an intermediate data sequence;
generating redundant bits based on the intermediate data sequence; and
providing a concatenation of the redundant bits with the DC-free encoded data to a channel.

15. The method of claim 14 further comprising:
providing the DC-free encoded data with run-length-limited constraints.

16. The method of claim 14 wherein the rate-1 mapping comprises:
arranging the block of DC-free encoded data into a first matrix form by rows and columns, and generating the intermediate data sequence arranged as a second matrix.

17. The method of claim 16 wherein the reverse rate-1 mapping comprises:
using a structured set partition of signals of an inter-symbol interference channel, and
generating the second matrix with rows and columns that have differentiated reliabilities after transmission through in a noisy inter-symbol interference channel.

18. The method of claim 14 and further comprising decoding of the user data by:
detecting DC-free encoded data received from the channel and providing an estimated DC-free encoded data; and
decoding the estimated DC-free encoded data output to provide DC-free decoded user data.

19. The method of claim 18 wherein detecting DC-free encoded data comprises:
using a sequence detector to receive equalized samples from the channel;
discarding paths in the sequence detector corresponding to intermediate data bits that violate MLC constraints; and
outputting an estimated DC-free encoded data corresponding to a survivor of the sequence detector.

20. The method of claim 18 wherein detecting DC-free encoded data comprises:
detecting the DC-free encoded data using a sequence detector and providing an estimated data output;
mapping the estimated data output into intermediate bits;
decoding the intermediate bits using a MLC decoder; and
mapping the decoded intermediate bits into an estimated DC-free encoded data output.

* * * * *